Feb. 17, 1953   F. D. LESLIE ET AL   2,628,525
SYSTEM FOR REMOVAL OF HEAT ENERGY FROM LIGHT BEAMS
Filed Nov. 12, 1948   2 SHEETS—SHEET 1
Fig. 1.
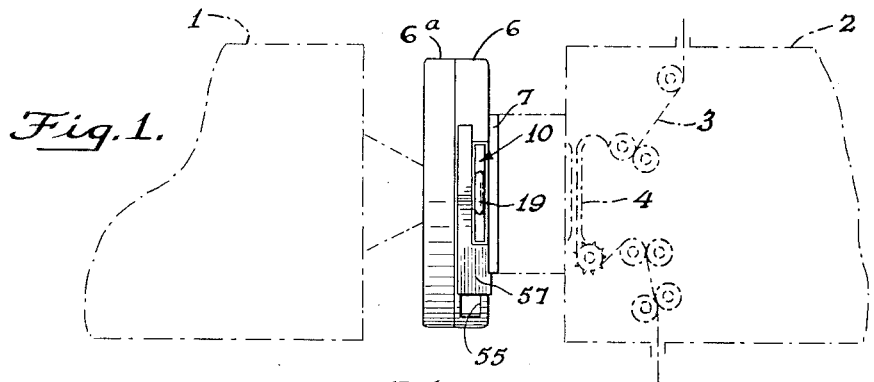
Fig. 2.
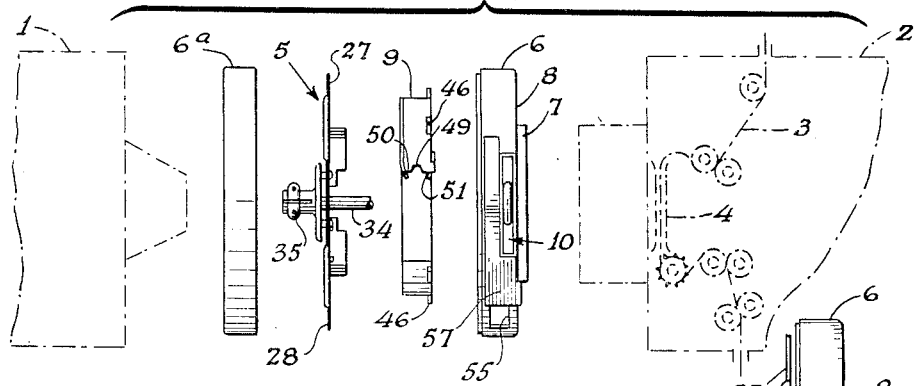
Fig. 4.
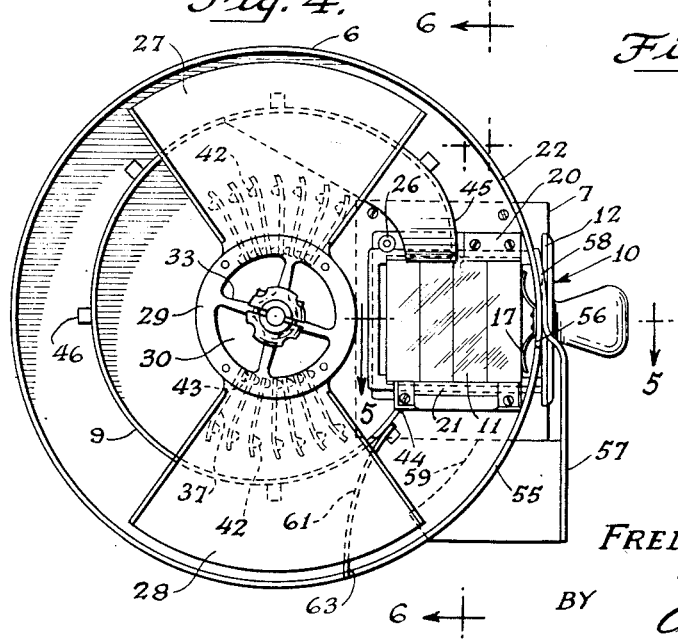
Fig. 3.
INVENTORS.
FRED D. LESLIE and
HERBERT E. BRAGG
BY
Albert M. Parker
ATTORNEY.

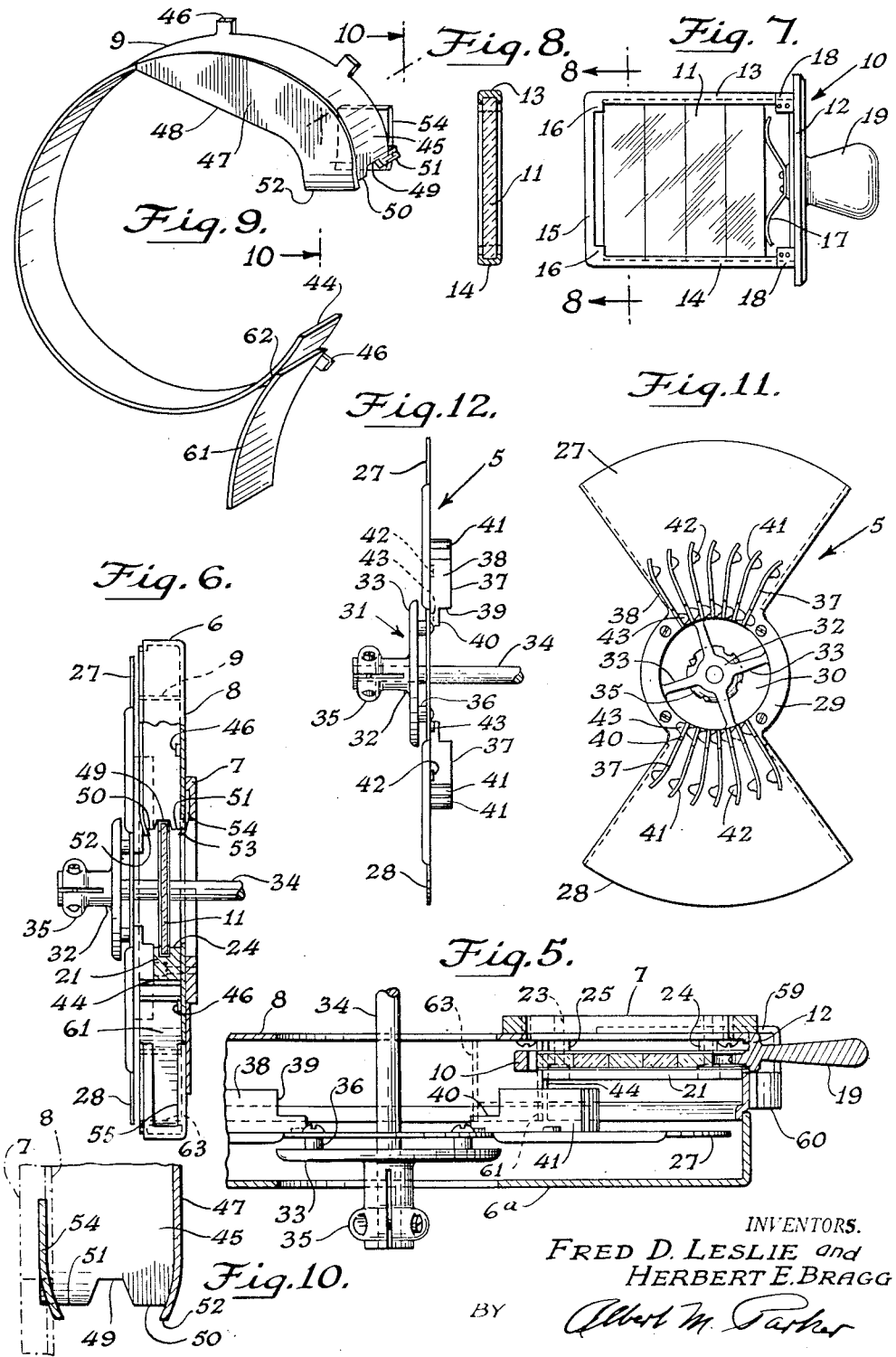

Patented Feb. 17, 1953

2,628,525

UNITED STATES PATENT OFFICE 2,628,525

SYSTEM FOR REMOVAL OF HEAT ENERGY FROM LIGHT BEAMS

Fred D. Leslie, Malverne, N. Y., and Herbert E. Bragg, Oxford, N. J., assignors to Twentieth Century Fox Film Corporation, New York, N. Y., a corporation of New York Application November 12, 1948, Serial No. 59,698

9 Claims. (Cl. 88—17)

This invention relates to motion picture projection apparatus and more particularly to systems forming part thereof for removing long wave length heat energy from the light beams of such apparatus.

Most of the additional applications of motion picture projection that have been introduced in recent years have called for increase in light intensity in order to obtain a satisfactory image on the screen. Examples of this are the projection of motion pictures in color and the drive-in theatre development. In the latter field, on which considerable interest has centered of late, the light intensity requirements are great. The area occupied by the spectators is much greater than that of the ordinary theatre, a larger screen is required, and, at the same time, sufficient light must be provided to project the picture clearly and sharply on to the screen in order for it to be properly viewed from all parts of the area.

The light source can, of course, be increased in intensity, but along with such increase there is a consequent increase in unwanted heat energy. This latter, in the form of wave lengths beginning at the long end of the visible portion of the spectrum, is propagated by radiation along with the light beam and produces undesirable effects. The principal such effect is, of course, the heating of the film at the film gate or picture aperture. Even though such film is travelling rapidly, though intermittently, past the film gate, the heat, accompanying light of suitable intensity, will be so intense that the film will tend to expand and bulge, or otherwise distort, while it is in the film gate. This action, even though slight, is sufficient to throw portions, if not all of the film out of focus. The latter condition is, of course, particularly undesirable in just such situations where the increased light intensity producing it is necessary.

Accordingly, it is the principal object of the present invention to reduce the heating of the film in a motion picture apparatus by energy emanating from the light source of such apparatus.

Another object is to reduce such heating without substantial reduction in the intensity of visible light from the source.

Still another object is to provide for such heat reduction without material structural additions to existing apparatus.

A further object is to provide for such heat reduction by employing as many of the existing parts of the motion picture apparatus as can possibly be employed.

Other and more detailed objects will in part become apparent, and will in part be pointed out hereinafter.

In the accompanying drawing:

Figure 1 is a side elevation of projection apparatus incorporating the invention, the conventional features of such apparatus being shown diagrammatically.

Figure 2 is a view similar to Figure 1 with the features of the invention incorporated therein being shown in an exploded manner.

Figure 3 is an enlarged front elevation of the right hand portion of the shutter housing, with shutter therein, as it appears in Figure 1.

Figure 4 is an end elevation thereof as viewed from the left in Figure 3.

Figure 5 is a fragmentary horizontal section taken on line 5—5 of Figure 4, but showing the shutter turned to a horizontal position.

Figure 6 is a view similar to Figure 3, but with a portion of the structure shown in section taken along line 6—6 of Figure 4 and looking in the direction of the arrows.

Figure 7 is a side elevational view of the slide for holding the absorptive glass.

Figure 8 is a vertical section thereof taken on line 8—8 of Figure 7.

Figure 9 is a perspective view of the air guide provided within the shutter housing.

Figure 10 is a fragmentary section taken on line 10—10 of Figure 9 and looking in the direction of the arrows.

Figure 11 is an elevation of the shutter showing the opposite face thereof to that depicted in Figure 4, and Figure 12 is an end elevation thereof looking at the Figure 11 showing from the left side thereof.

In the accompanying drawing and description thereof to follow, one particular embodiment of the invention will be illustrated and described. It is to be understood, however, that the details shown are for illustrative purposes and are not to be taken in a limiting sense. Different types of motion picture projection apparatus incorporate different arrangements and relationships of the parts from those here shown, but, in principle, they are usually substantially the same. Accordingly, by suitable codifications, or variations, to fit complementary differences in the equipment, over that illustrated herein, one skilled in the art would be capable of adapting the instant invention to such differences in equipment.

In Figures 1 and 2, a conventional lamp house is diagrammatically shown at 1, while a conventional projection head housing is similarly shown at 2. There is also diagrammatically shown with the projection head 2 a film 3 passing by the film gate 4, and being fed and guided on its way by conventional roller, and the like, mechanism. A rear shutter 5 is received within the two parts of the shutter housing, the front part of which is shown at 6 and the rear part at 6a. A frame 7, suitably secured to the back 8 of the part 6 serves as a mounting for the usual spot sight box and also serves another purpose as will appear hereinafter. The front part 6, in the embodiment here illustrated, contains, or has applied thereto, various elements going to make up the system of the invention one of the principal of which is the air guide 9.

A slider 10 holding strips of heat absorbing glass 11 is inserted through the edge of the housing 6, as shown in Figures 1 through 5. This slider is so dimensioned and positioned that its glass elements 11 overlie the position of the usual projection opening. The slider as shown is in the form of a rectangular frame having a front 12, top and bottom members 13 and 14, and a rear end member 15. The members 13 and 14 are channelled, as shown in Figure 8, to receive the free ends of the glass elements 11. The end member 15 is provided with stops 16 spacing the rear glass element from the body of the member 15 and providing an air passage therebetween. A spring 17, carried by the front wall 12, maintains the glass elements in contact with each other, thus urging the rear one against the stops 16 and provides an air space between the front glass element and the member 12. The sides 13, 14, and 15 of the frame are suitably demountable from the front 12 by some means such as the screw plates 18, in order to enable the replacement of the glass strip 11 if necessary. The front of the frame is provided with a handle 19, to enable its ready manipulation.

The presence of glass elements such as those shown at 11 is an essential feature of the invention. These elements are of a type of glass which absorbs the undesirable long wave length energy commencing at, and continuing above, the long end of the visible portion of the spectrum such as emitted by the light sources commonly employed in motion picture projection apparatus. On the other hand, such glass is capable of transmitting wave lengths within the visible portion of the spectrum without materially reducing the same, and so long as its thickness is kept at a reasonable maximum, the color effect on the visible wave lengths will not be noticeable.

The longer wave length energy absorbed by the glass elements 11, is, of course, turned into heat. This glass has the capacity for absorbing a large amount of heat, but due to its poor conductive effect, retains it. Preferably, then such glass should be used in the form of several separate strips, rather than in a single large piece. This preference is due to the fact that the absorption of so much heat energy by the glass causes internal stresses and strains to act whence the glass, if formed in one piece might cause distortion besides affecting the adjustment of the apparatus and the amount of light available for its operation. These undesirable effects are reduced when the glass is formed in separate strips, instead of a single piece. Nevertheless, it is desirable to provide for the removal of as much as possible of the unwanted radiation, the accomplishment of which will appear hereinafter. No precise size of glass strip is recommended, but we have found it convenient to use a length to width ratio of about two or three to one. Furthermore, as already pointed out, thickness is determined by the amount of color tolerance permissible.

The slider 10 rides in upper and lower track members 20 and 21, the upper of which is shorter than the lower and is located adjacent the edge 22 of the housing 6. By reference to Figures 5 and 6 it will be noted that the track members 20 and 21 are spaced from the back wall 8. The member 21 is there shown as secured by bolts, such as 23 passing through the wall 8 into the frame 7. These bolts also pass through spacer elements 24 and 25. The portion 20 is similarly secured in spaced relation with respect to wall 8. Likewise, an aligned guiding element 26, which cooperates with the short portion 20, engages the portion 13 in spaced relation with respect to the wall 8. This spaced mounting enables the free passage of air down between the back wall 8 and the opposed back face of the glass elements 11.

The housing portion 6 also receives the shutter 5 and the air guide 9 (Figures 2, 4 and 9). The shutter 5 has conventional shutter blades 27 and 28 carried by an annular hub-like portion 29 which latter furnishes a large interior opening 30. A spider 31, including a bearing collar 32, from which mounting arms 33 extend, is mounted upon the conventional shutter shaft 34. The clamping element 35 secures the bearing collar 32 in place on the shaft 34. Spacing and seating portions 36 are employed to mount the shutter 5 on the spider 31 by use of screws or other suitable means. The important feature here is that though the spider 31 provides an adequate and substantial mounting for the shutter, it nevertheless leaves substantial space inside of the annular hub 29, as indicated at 30, for the passage of air therethrough. The mounting collar 32 and the arms 33 take up a minimum of space and the arms 33 are spaced from the annulus 29 by the members 36.

The face of the shutter towards the projection head, hereinafter referred to as the front face, is equipped with two series of vanes 37. In the present instance, these vanes are formed identical and have seven in each series. One of the series is secured to each of the shutter blades 27, and 28. We have found this particular shape and number of vanes to be highly efficient, though other numbers and forms of blade have also provided effective results. Furthermore, it is to be appreciated that the different types of projection apparatus to which our invention is applicable may make it necessary to modify the shape or grouping of the vanes, or may require that the necessary current of air be produced in a different manner.

Each vane 37 is formed of an elongated strip of suitable material having a wide outer body portion 38 extending throughout most of its length, an inward step 39 at the inner edge of portion 38, and a reduced inner extending portion 40. As shown at 41, a substantial part of each portion 38, extending inward from the free end thereof, is curved in the opposite direction to the travel of the shutter. Each of these vanes is suitably secured to the front face of the shutter 5 by means such as tabs 42 extending laterally from the portion 38 and tabs 43 similarly extending from the reduced portion 40 thereof.

As will be apparent from the showings in the various figures of the drawing, the vanes 37 are so located as to commence at the inner edge of the annular hub 29 and diverge as they extend away from that edge. In the course of their divergence they commence to curve at 41 in a direction opposite to the direction of rotation of the shutter. The vanes 37 only extend part way out along the shutter blades, but they are so formed and positioned as to take the air coming in through the opening 30, and circulate it in desired direction. Such a combination shutter and impeller will move a substantial volume of air at substantial velocity.

The air guide housing 9 lies within the housing portion 6 and surrounds the normal path of the vanes 37. The commencing end 44 of the guide 9 is located at the inner end of the track member 21, while its terminating end 45 extends to substantially the middle of the glass slide 10. The guide 9 consists of a strip of suitable material extending outwardly from the inner face of the back 8 of the housing portion 6 to overlie the series of vanes 37 as seen in Figure 4. The guide 9 is secured in place on the wall 8 by means of suitable laterally bent tabs 46.

From the Figure 4 showing, it will be apparent that the vanes 37 just clear the inside of the guide 9 at its beginning end 44. At its opposite end 45, however, the upstanding wall of the guide 9 is well away from the ends of the vanes. This is due to the fact that the curve of the guide 9 is on a gradually increasing radius from the end 44 to the end 45. The purpose of this increase in size of the guide 9 is to increase the space available for the movement of air impelled toward the end 45 by the shutter vanes. Consequently, the velocity of such air increases right up to the discharge end 45 of the guide 9 where the same overlies the glass strips 11 in the slide.

The objective of the air impelling and guiding instrumentalities just discussed is to provide for the passing of as much air as possible down past both sides of the glass strips 11, to thus remove a substantial portion of the heat absorbed and retained by the glass strips. It is of importance, of course, that such air be properly directed to and away from the glass strips. To assist in this, it has been found desirable to equip the guide 9 with an inwardly extending side shield 47 adjacent to its discharge end, so that the air, once its velocity has been well attained, will be properly directed. By reference to Figure 4 it will be noted that the inner edge 48 of the shield 47 very closely approaches the path followed by the outer edge of the vanes 37. Thus the escape of air between the ends of the vanes and the shield 47 is substantially eliminated.

In order to direct the air most effectively from the end of the guide 9 down past both sides of the glass plates in the slide 10, it is important that the end 45 be specially formed. In the first place that end is slotted at 49 to receive the upper member 13 of the frame 10 (see Figure 6). On each side of the slot 49 there are downwardly extending tongues 50 and 51 the forward one of which, 50, is curved inwardly while the rear one, 51, is curved outwardly. We have found that these directions of the tongues, in conjunction with other elements about to be mentioned, cause the greatest flow of air down past the faces of the glass strips 11.

The other elements just referred to are the inturned lips 52 and 53. The lip 52 as here shown is an inturned integral extension of the shield 47 while the lip 53 is provided by a separate strip 54. The strip 54 is suitably secured in place by being engaged between the frame 7 and adjacent portion of the wall 8. By reference to Figures 4, 6, and 9, it will be apparent that the lip 52 co-operates with the tongue 50, and the lip 53 co-operates with the tongue 51 in order to most effectively direct the air from the guide 9 against, and down past the opposite sides of the glass strips in the slide 10. The desired condition of substantially equal flow past either face of the glass is substantially assured by this arrangement.

It is also important that a free path be provided for the escape or expulsion of the heated air from the shutter housing. Thus the housing portion 6 is cut away, as shown at 55, commencing at approximately the horizontal center thereof, as indicated at 56 in Figure 6, and extending downward for a substantial distance. This cutaway portion is of substantial width and the air escaping out therethrough is directed downwardly by a baffle element 57. This baffle element is secured in suitable fashion to the housing portion 6 by means of a strip 58 engaging the wall 22 just above the upper end 56 of the opening. The element 57 also has a front side wall 59 secured to the outside of the bottom 8, as indicated in Figure 5. In addition, it preferably has a side wall 60 extending into engagement with the face of the portion 22.

A complementary baffle element 61 is located within the housing 6 to cooperate with the element 57. The element 61 commences adjacent the end 44 of the guide 9 and is suitably secured to the outside thereof at 62. It is of the same width as the guide 9 and extends downward in a suitable smooth curve to terminate at the lower end 63 of the opening 55. By occupying the full width of the guide 6 the baffle element 61 prevents heated air passing the slide 10 from circulating within the shutter housing 6. Instead the baffle element 61 cooperates with the baffle element 57 to direct heated air entirely away from the vicinity of the shutter housing.

From the foregoing illustrative showing of a system for putting our invention into practice, it will be apparent that increase in light intensities in motion picture projection is now attainable without deleterious overheating of the film. Furthermore, the invention contemplates a system which is applicable to a wide variety of projection apparatus, without adding materially to such apparatus, and by taking advantage of existing structures and instrumentalities of such apparatus. It is, accordingly, to be expressly understood that the embodiment of the invention, as shown in the accompanying drawing, and described in the foregoing description thereof, is to be considered as illustrative, rather than in a limiting sense.

Having disclosed our invention, what we claim as new and desire to secure Letters Patent for is:

1. In motion picture apparatus a rear shutter housing formed with aligned apertures therethrough for the passage of a beam of light, a light transmissive, heat absorptive element, means to mount said element within said housing over one of the apertures therein and means within said housing to create a current of air and direct it against an edge of said element said directing means including a bordering wall having one edge secured to an inner face of said shutter housing and extending laterally therefrom, and said wall terminating closely adjacent said edge of said heat absorptive element, and a confining wall element extending from said bordering wall adjacent the terminating end thereof, and lying in opposition to said inner face of said rear shutter housing.

2. In motion picture apparatus a rear shutter housing, a shutter within said housing, vanes on said shutter for creating a current of air in the direction of movement of said shutter, a wall formed within said housing and surrounding the path of said vanes, a light transmissive heat absorptive element within said housing, said element being mounted in spaced relation with respect to the adjacent face of said housing, said wall commencing at one edge of said element and terminating at an opposed edge thereof, said wall at its commencing end lying closely adjacent the peripheral path of said vanes and departing from the same on a gradually increasing radius in its extent toward its terminating end.

3. A shutter for motion picture apparatus comprising a spider including a mounting hub with spaced arms extending away therefrom, a shutter blade mounted adjacent the ends of said arms, said shutter blade commencing at said mounting position and extending outwardly thereof, and a plurality of vanes mounted on one face of said shutter, said spider being formed for passage of air to the commencing end of said blades said vanes comprising strips of material extending laterally and substantially radially of said shutter face and having their outer ends curved in a direction opposite to the direction of rotation of said shutter.

4. In motion picture shutter construction, a shutter blade and an air impelling vane, said air impelling vane being carried on the face of said shutter blade and extending a substantial distance laterally therefrom, said vane being formed with a straight portion and a curved portion, said straight portion extending from the inner end of said vane radially outward for a substantial portion of the vane and terminating in said curved portion, said curved portion extending in a direction opposite to the normal direction of rotation of said shutter.

5. In motion picture apparatus, a rear shutter housing, a shutter within said housing, said housing being formed with aligned apertures therethrough for the passage of a beam of light, a light transmissive heat absorptive element seated in said housing in spaced relation to the walls thereof and lying across the path of said beam of light, means formed on said shutter for creating a current of air, a directing wall within said housing for directing the flow of said current of air, said directing wall adjacent its exit end being formed with a laterally extending confining wall portion on one edge thereof and having its other edge secured to the inner face of said shutter housing, said directing wall terminating adjacent an edge of said light transmissive heat absorptive element, said heat absorptive element being of less width than the width of said directing wall whereby air emitted from the end of said wall will flow past the opposite faces of said heat absorptive element.

6. In motion picture apparatus, a rear shutter housing a shutter within said housing, means formed on said shutter for creating a current of air in said housing in the direction of rotation of said shutter, a seat formed in said housing for the reception of a light transmissive heat absorptive element and a directing wall within said housing surrounding said current creating means and terminating across an edge of said seat, said wall commencing closely adjacent the peripheral path of said current creating means and departing from said peripheral path in gradually increasing extent in the direction of rotation of said shutter.

7. A shutter for motion picture apparatus comprising a mounting hub, spaced arms extending from said hub to form an air passage therebetween, a shutter blade carried by said arms at the outer ends thereof, said shutter blade having its inner peripheral edge bordering said air space, a vane mounted on one face of said shutter, said vane commencing closely adjacent the inner peripheral edge of said shutter edge and extending radially outwardly along said blade to terminate at its outer end in a portion curved in a direction opposite to the direction of rotation of said shutter.

8. In motion picture projection apparatus, a shutter, a radially and laterally extending vane formed on said shutter for creating a current of air, a directing wall substantially surrounding the path of the outer end of said vane, said directing wall commencing at a position closely adjacent the outer end of said vane and extending spirally away from said end of said vane in the direction of rotation of said shutter, said directing wall formed with a confining terminating end in spaced relation to the commencing end thereof.

9. In motion picture projection apparatus, a shutter, a radially and laterally extending vane formed on said shutter for creating a current of air, a directing wall substantially surrounding the path of the outer end of said vane, said directing wall commencing at a position closely adjacent the outer end of said vane and extending spirally away from the end of said vane in the direction of rotation of said shutter, said directing wall terminating in a three-sided duct portion for confining the current of air created by said vane adjacent the exit of said air from said directing wall.

FRED D. LESLIE.
HERBERT E. BRAGG.

REFERENCES CITED

The following references are of record in the file of this patent:

UNITED STATES PATENTS

| Number | Name | Date |
|---|---|---|
| 1,479,630 | Sperry | Jan. 1, 1924 |
| 1,489,332 | Outrey | Apr. 8, 1924 |
| 1,666,047 | Jones et al. | Apr. 10, 1928 |
| 1,758,689 | Riccio | May 13, 1930 |
| 2,029,871 | Johnson | Feb. 4, 1936 |
| 2,279,084 | Tillyer | Apr. 7, 1942 |
| 2,378,682 | Brenkert | June 19, 1945 |
| 2,413,288 | Cahill | Dec. 31, 1946 |
| 2,461,140 | Capstaff | Feb. 8, 1949 |